United States Patent [19]
Wu et al.

[11] Patent Number: 6,102,339
[45] Date of Patent: Aug. 15, 2000

[54] SUN-SYNCHRONOUS SUN RAY BLOCKING DEVICE FOR USE IN A SPACECRAFT HAVING A DIRECTIONALLY CONTROLLED MAIN BODY

[75] Inventors: Albert T. Wu, Paramus; Linchih O. Liu, West Winsor Township, Mercer County, both of N.J.

[73] Assignee: Turbosat Technology, Inc., Princeton Junction, N.J.

[21] Appl. No.: 09/062,594

[22] Filed: Apr. 17, 1998

[51] Int. Cl.[7] ...................................................... B64G 1/44
[52] U.S. Cl. ............................................................ 244/173
[58] Field of Search ........................... 244/158 R, 158 A, 244/168, 173

[56] References Cited

U.S. PATENT DOCUMENTS

| | | | |
|---|---|---|---|
| 3,715,600 | 2/1973 | Fletcher et al. ...................... | 244/173 X |
| 4,133,502 | 1/1979 | Anchutin ................................. | 244/173 |
| 4,262,867 | 4/1981 | Piening ................................. | 244/173 X |
| 4,508,297 | 4/1985 | Moulihayrat et al. ................... | 244/173 |
| 4,725,023 | 2/1988 | Shiki ..................................... | 244/158 A |
| 5,372,183 | 12/1994 | Strickberger ............................... | 165/41 |

Primary Examiner—Robert P. Swiatek

[57] ABSTRACT

A sun-synchronous sun ray blocking device for use in a spacecraft having a directionally controlled main body, such as a low inclination angle earth (as well as other planets) orbit spacecraft, that is, a three axis stabilized spacecraft having north, south, east, west, earth and anti-earth panels defining a spacecraft main body. The north and south panels, on which the spacecraft equipment with high heat dissipation is usually mounted, have their planar normal axes relatively parallel to the spinning axis of the earth. Normal to each of the north and south panel, a solar panel loaded with solar cells is extended and is directly rotating about the same axis. The solar panels are controlled in such a way that the solar cells side of the panels always faces the sun. Each solar panel's blocking device is situated between the solar panel and sun, attached to its solar panel and rotated therewith, to block the sunlight from the north and south panels, providing a stable, benign thermal environment for those panels.

20 Claims, 7 Drawing Sheets

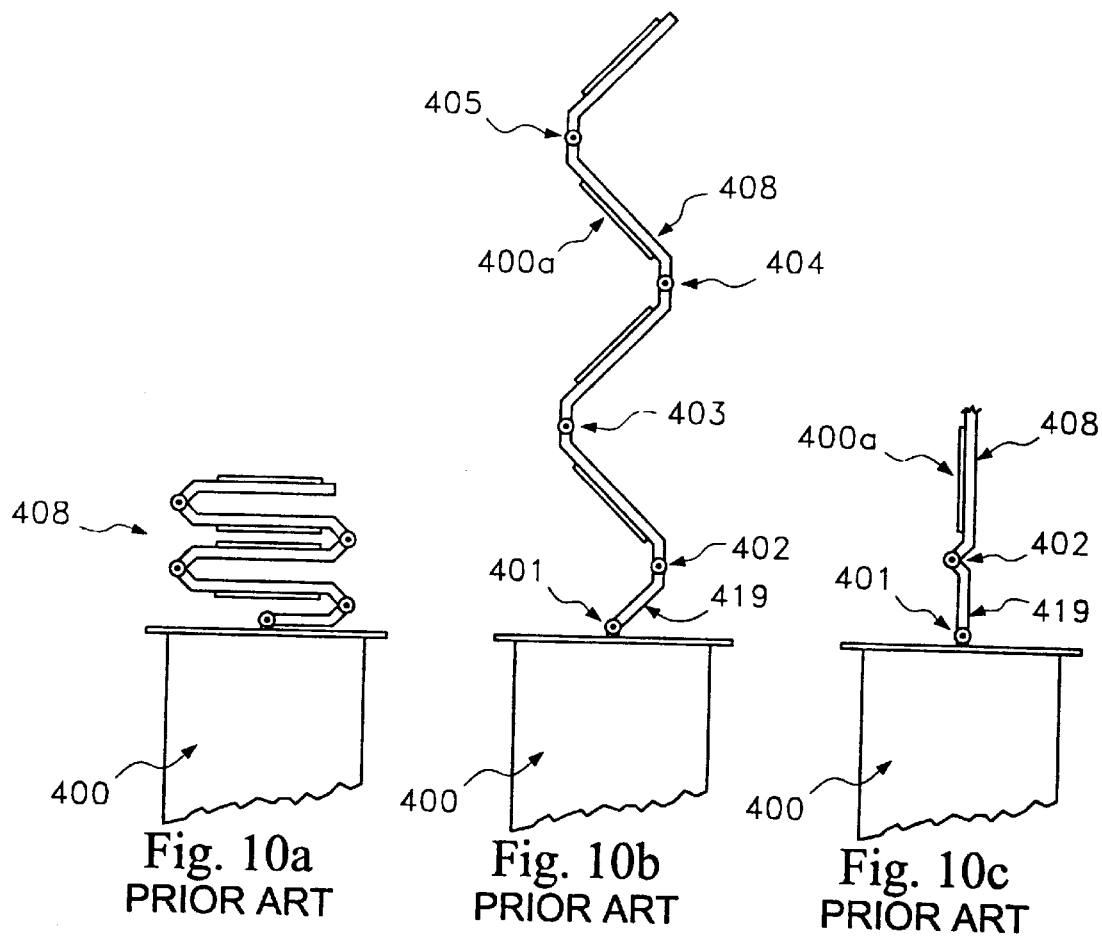
Fig. 10a
PRIOR ART
Fig. 10b
PRIOR ART
Fig. 10c
PRIOR ART
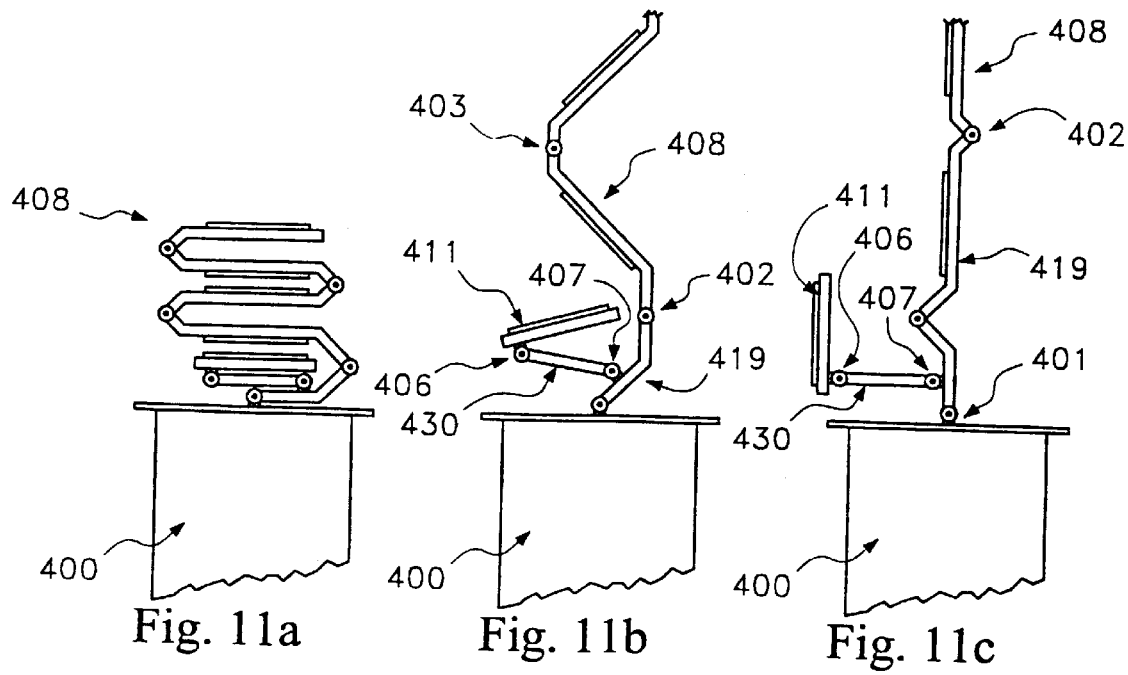
Fig. 11a
Fig. 11b
Fig. 11c

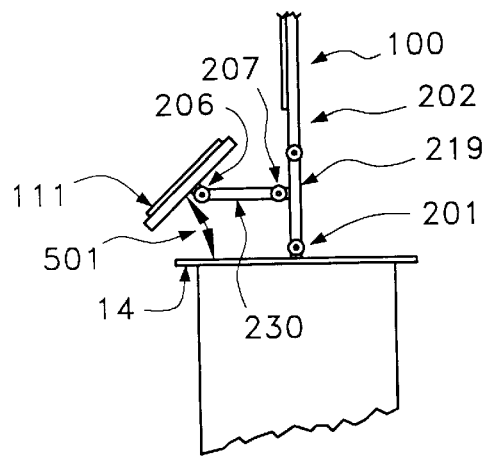
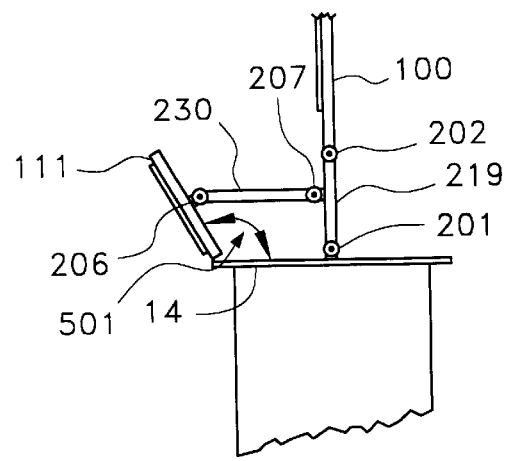
Fig. 12a  Fig. 12b
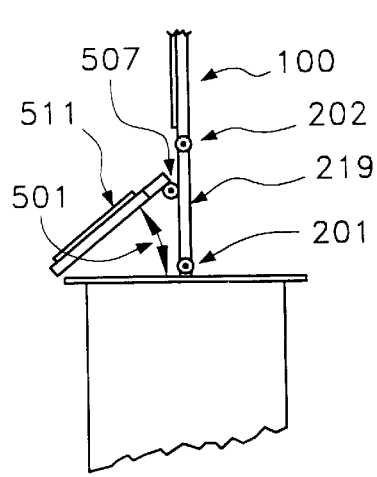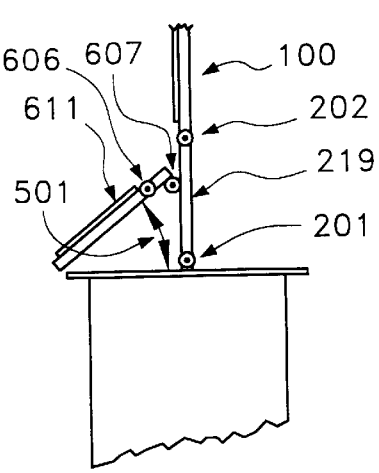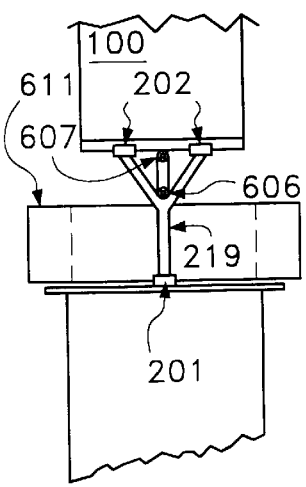
Fig. 13  Fig. 14a  Fig. 14b

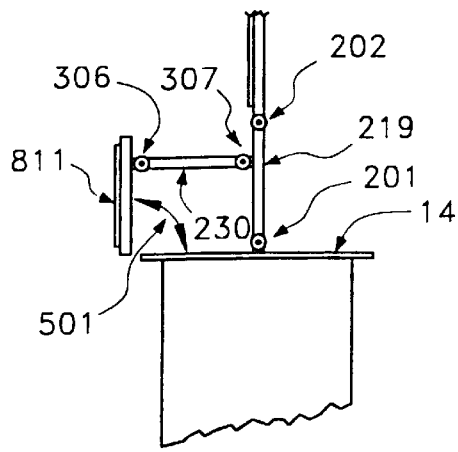
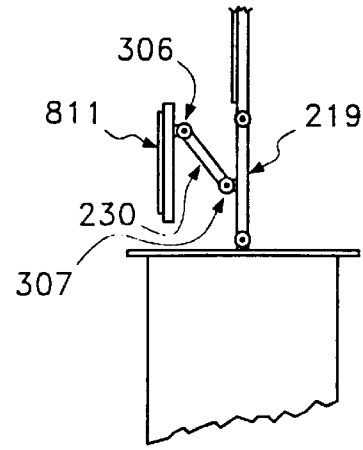
Fig. 15a  Fig. 15b
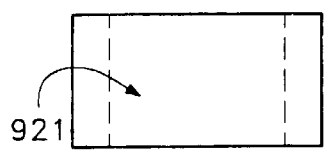
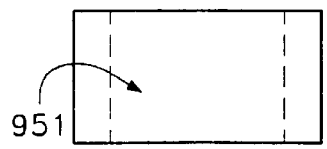
Fig. 16a  Fig. 17a
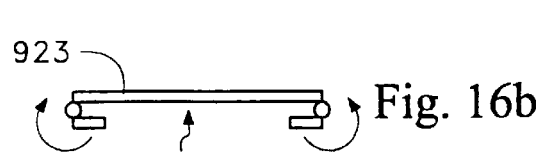
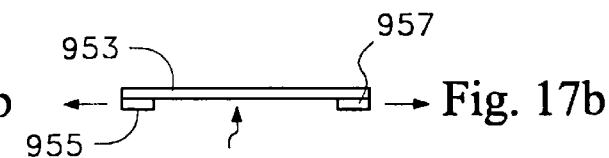
Fig. 16b  Fig. 17b
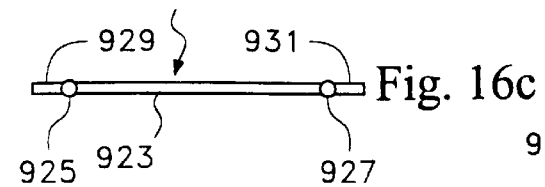
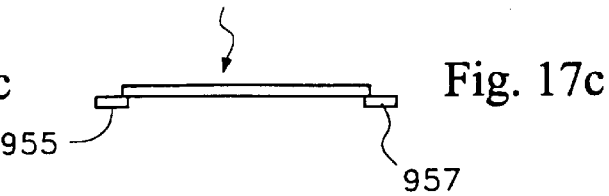
Fig. 16c  Fig. 17c

SUN-SYNCHRONOUS SUN RAY BLOCKING DEVICE FOR USE IN A SPACECRAFT HAVING A DIRECTIONALLY CONTROLLED MAIN BODY

BACKGROUND OF THE INVENTION

1. Field of the Invention

The present invention relates to a sunlight blocking device, and, in particular, to sunlight blocking devices which establish a thermal control mechanism for a spacecraft having a directionally controlled main body, i.e. one situated in an orbit having a low angle between the orbit plane and the sun vector, such as a low inclination orbit, and generally, an equatorial orbit. Spacecraft as used herein includes satellites and other space bound vehicles.

2. Information Disclosure Statement

The following patents are generally representative of the prior art in the broad field of solar cells sun shields for various types of spacecraft:

U.S. Pat. No. 4,133,502 to Andrew Anchutin describes a plurality of arrays of solar cells which are symmetrically stored about a spacecraft during launch to provide symmetrical loading. When the spacecraft is in operational configuration, the solar arrays are deployed adjacent each other on one side of the spacecraft to effectively form a single array and the single array may be oriented to face the sun by a common drive mechanism.

U.S. Pat. No. 4,508,297 to Guy G. Mouilhayrat et al, describes an equatorial orbit satellite with solar panels having blades with a median line inclined at a certain angle relative to the equatorial plane. Thus, the field of vision of the antennas is free and disturbing torques become acceptable.

U.S. Pat. No. 4,725,023 to Haruo Shiki describes a geostatic satellite which comprises a spinning drum for stabilization which spins around an axis of rotation which is parallel to the axis of the earth. A paddle member loaded with solar cells is directly rotatable about the same axis and is controlled such that the solar cells face the sun. A despun platform supports communication gear and maintains the gear pointed to a relatively fixed point on earth. A shading device for shading the electronics laden despun platform from the sun, is attached to the paddle member and rotatable therewith. Thereby, the shading device will always be disposed between the sun and the despun platform.

U.S. Pat. No. 5,372,183 to Harold P. Strickberger describes a spacecraft adapted for operation in a low inclination angle earth orbit which comprises north, south, east and west panels defining a spacecraft interior volume. The north and south panels are oppositely disposed with respect to each other and the east and west panels are oppositely disposed with respect to each other. The spacecraft interior volume generally and preferably lacks structural elements that substantially restrict thermal radiation among the panels. The north and south panels, to which spacecraft equipment is usually mounted, each include conductive heat pipes for reducing the temperature difference across each panel. The exterior surfaces of the north, south, east and west panels have a covering, preferably of optic solar reflectors (OSRs), for radiating thermal energy therefrom, wherein the OSRs have a solar absorptivity that is substantially less than their thermal emissivity. The interior surfaces of the north, south, east and west panels have a covering for effectively radiating thermal energy between and among the panels across the interior volume.

Notwithstanding the prior art, the present invention is neither taught nor rendered obvious thereby.

SUMMARY OF THE INVENTION

The present invention involves a sunsynchronous sun ray blocking device for use in a spacecraft having a directionally controlled main body orbiting about a planet in an orbit with low orbit-sun angle, i.e. the angle between the orbit plane and sun vector, such as a low inclination angle earth (as well as other planets) orbit spacecraft, that is, a three axis stabilized spacecraft. This spacecraft has solar cell panels with sunlight blocking devices attached to the solar cell panels and rotate therewith. The solar cell panels, which are mounted on the north and south equipment panels of the spacecraft extending northward and/or southward, rotating about the axis relatively parallel to the axis of the planet, i.e., the earth, are controlled such that the solar cell side of the panel always face the sun. The sunlight blocking devices, while rotating with the solar cell panels, are able to prevent the sunlight from reaching entire or part of the north and/or south equipment panels, thus creating a continuous steady and benign thermal environment for those panels of the spacecraft.

BRIEF DESCRIPTION OF THE DRAWINGS

The present invention should be more fully understood when the specification herein is taken in conjunction with the drawings appended hereto wherein:

FIGS. 10a, 10b and 10c illustrate a portion of a top view of a prior art spacecraft solar cell array;

FIGS. 11a, 11b, and 11c and FIGS. 12a and 12b, respectively, show the functional aspects of the present invention devices using the prior art spacecraft shown in devices shown in FIGS. 10a, 10b, and 10c as a base;

FIGS. 13 and 14a show top views of the alternative present invention device in partial view and FIG. 14b shows the front partial view of FIG. 14a;

FIGS. 15a and 15b show top open partial views and top partially closed partial views of the alternative present invention device;

FIGS. 16a, b and c show front, top closed, and top open views of an alternative shade for the present invention alternative devices; and, FIGS. 17a, b and c show front, top closed, and top open views of an alternative shade for the present invention alternative devices.

DETAILED DESCRIPTION OF THE PRESENT INVENTION

Figure 1:
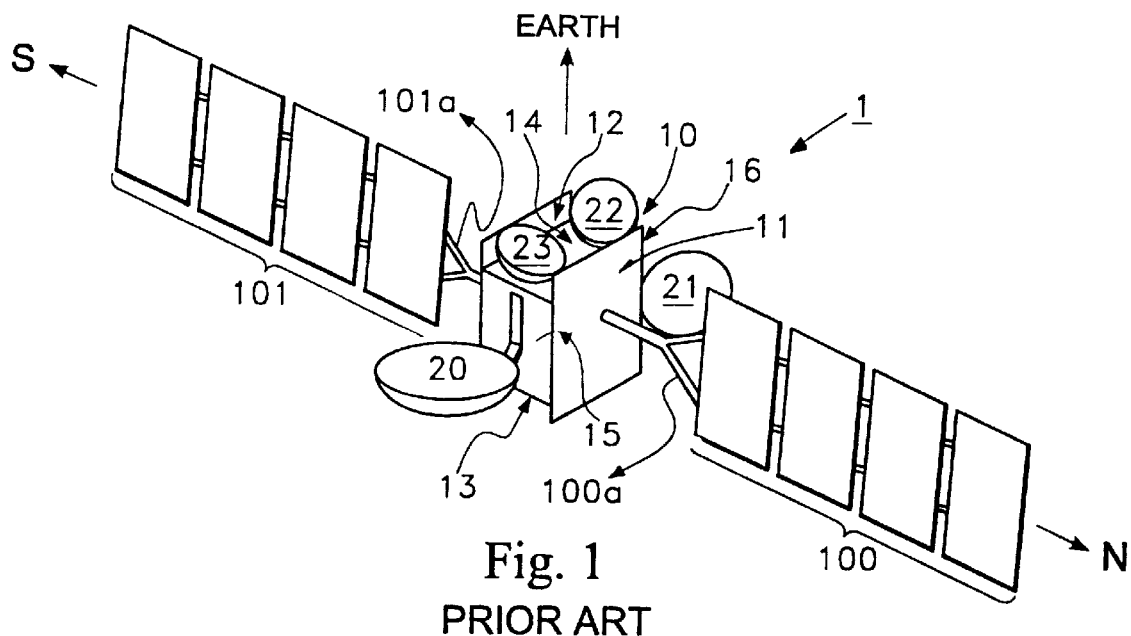
FIG. 1 is a simplified perspective view of a prior art three axis stabilized spacecraft.

One type of spacecraft operating in a generally equatorial orbit around a planet, e.g. the earth, or in particular, a geostationary orbit, is usually used for the purposes of communication, broadcasting, monitoring for ecological conditions, global positioning, remote sensing, surveillance and weather forecasting. Such a satellite is typically classified as either body stabilized type or spin stabilized type.

The present invention relates specifically to the body stabilized type spacecraft, also referred to herein as spacecraft having a directionally controlled main body, and not spin stabilized type spacecraft. Spin stabilized type spacecraft have the main body spinning rapidly (many cycles per orbit) while it is orbiting about a planet, and body stabilized type spacecraft maintain a particular surface so as to always face the planet it is orbiting, i.e., one rotation per orbit. A body stabilized type satellite, also known as a three axis stabilized type, is generally in the shape of a predetermined structure, having, for example, a rectangular structure, e.g., six surfaces, usually referred to as panels. In order to provide its functional services while orbiting, the satellite will have one panel continuously facing the planet, e.g. earth, referred to as the earth panel, or the nadir panel. The normal vector of the nadir panel is pointing generally to the center of the planet. The panel opposite the nadir panel sharing the same planar normal vector, is usually referred to as the anti-earth panel, or zenith panel. Two other panels with their planar normal vector laying on the orbital plan pointing to the velocity vector of the satellite, which is generally tangential to the orbit pointing eastward with respect to the earth, are referred to as east panel and west panel. The remaining two panels whose normal vectors are generally perpendicular to the orbit plan which generally is in parallel with the spin axis of the earth, are referred to as north panel and south panel.

Each time the spacecraft orbits a planet, earth in a preferred embodiment, the sun will sequentially directly illuminate east, anti-earth, west and earth panels, which makes those panels unable to effectively radiate thermal energy to the deep space. The north and south panels, however, are generally facing the deep space during the entire orbit and only receive sun illumination at a relatively low incident angle on a seasonal basis. Without or with little solar input to the surfaces, those panels become the principle thermal energy radiating surfaces of the spacecraft. The north panel will receive seasonal solar heating for a duration of about 6 months (from about March 21st to about October 21st) at an incident angle, defined as the angle between the panel plane and the sun vector, varied from 0° (sun vector is edge-on to the panel) to about 23.5°, and seasonally returns to 0° while the sun is on the north side of the earth equator, known as the summer solstice. The south panel will receive seasonal solar heating for the balance of the 12 month period known as winter solstice in a similar fashion and concomitantly with the north panel. The maximum solar incident angle of 23.5° only accounts for approximately 40% of the intensity of the direct (90°) solar incident angle.

In addition to the generally favorable low sun ray's incident angle to the north and south panels, numerous design practices have been employed to the surface treatment of these two panels in an effort to reduce the absorbed solar heat thus allowing more internal heat dissipation without raising the component's operational temperature level. One example, the OSR's which have a high ratio of emissivity vs. absorptivity have been widely used as the panel surface treatment. However, the seasonal solar heating still remains as a significant amount of heat input to the spacecraft which forces the spacecraft designer to lower the internal power level thus maintaining an acceptable operating temperature for the components. The undesired solar energy absorbed by the spacecraft through the north and south panels has two obvious drawbacks to its performance:

(1) It reduces the allowable internal power, which directly relates to the "value" of a spacecraft. The revenue of a spacecraft, especially a commercial satellite, is driven by its power level. Reduced allowable power level will directly reduce the revenue to be achieved by a spacecraft, thus reducing the "value" of the spacecraft; and, (2) The internal components' operating temperatures will be increased, and as a result, the reliability of those components may be reduced. The reliability also relates to the life of a spacecraft which directly relates to its "value" as well.

If the undesired solar heating can be further reduced or nearly eliminated, more operational payload power within the spacecraft is will be available and will provide lower operating temperature for the internal components. Therefore, by virtue of the present invention, the spacecraft will be operated at a higher efficiency, better reliability and more revenue which would increase its value.

There is another important factor which affects the capability of a panel rejecting heat into the deep space: the "effective" radiation view factor (ranged from 0 to 1) from that panel to the deep space. The ideal view factor for a panel to reject maximum heat into deep space is 1. Any device or means situated between the panel and deep space could block the panel's view to the deep space and thus reduce the heat rejecting capability of the panel. It is therefore another objective of the present invention to provide an arrangement not only to reduce or eliminate the solar heating to the north and south panels, but also not to create a blockage which may reduce the panel's view factor to deep space. In order to achieve that objective, the material or design selected for the blocking device, which will be discussed below, shall have heat insulation characteristics between the front (sun side) and back side of the blocking panel.

It is therefore an object of the present invention to provide a sun ray blocking device which is capable of greatly reducing or eliminating the incident energy from the sun to either or both the north and south panel of a three axis stabilized spacecraft orbiting a planet in an orbit with low orbit-sun angle, including orbits of low inclination angle or on an equatorial plane.

It is another object of this invention to provide a sun ray blocking device which, while blocking the sun's rays, minimizes the effective radiation view factors blockage from the heat rejection panels to the deep space.

A sun ray blocking device according to this invention is provided for use in combination with a 3-axis stabilized spacecraft, the main body of the spacecraft having at least one, and preferably two, major heat rejection panels, north and south panels, with respect to the orbit plane. The sun ray blocking device of the present invention is conveniently attached to the solar panel frames, i.e. assemblies, of the spacecraft and rotates therewith. Thus, the present invention follows the movement of the sun with respect to the north and south panels, casting its shadow onto the panel seasonally, coupled with its low effective blocking view factor for those panels, and provides a benign thermal environment for those panels.

In addition to the foregoing, some of the considerations, advantages and parameters for present invention devices are as follows. Others will become self-evident from the subsequent discussion of the FIGURES:

The blocking panel can be of any form or shape as long as it follows the move of the sun with respect to the spacecraft and it blocks the sun ray by casting a shadow onto the spacecraft main body at appropriate times.

The material or the configuration of the blocking panel shall have a heat insulation characteristic between its sun side and the opposite-sun side in order to provide minimum "effective" radiation view factor blockage to the north or south panels.

The blocking panel plane can be in any direction (for example, the angle 501 in FIG. 12a below does not have to be a 90° right angle) as long as it casts shadow to cover the required area on the spacecraft main body.

The ideal width of the blocking panel is greater than either the width or the length of the north/south panel which may limit the allowable dimension due to launch vehicle envelope constrains, thus the sun blocking panel may need to extend its width after deployment. This can be achieved by hinge deployment, slide extension, pre-offset or any other means to increase the width of the blocking panel (FIGS. 16a, b and c, and 17a, b and c discussed below).

The elongated deployment/supporting mechanism for the blocking panel can be passively deployed by hinge points or, at spacecraft designer's discretion, be actively driven by one or multiple motors for extension or retraction motions in order to allow the spacecraft to perform needed operations such as station keeping and/or attitude control.

This invention is also applicable to the spacecraft on those orbits other than on the low inclination or equatorial orbit planes. One example, a low earth orbit configuration called sun-synchronized orbits, is well known in the space industry. The angle between the orbit plane and the sun vector is maintained closed to constant at all time, i.e. the orbit plane points to the sun at a fixed angle as the planet travels around the sun (the earth travels around the sun once every year). For those spacecrafts (satellites) operating in sun-synchronized orbits which have greater-than-zero orbits-sun angles and having sun-tracking solar cell arrays extended in parallel with the orbit normal vector and rotating therewith, a sun blocking device according to this invention is applicable to provide a shaded benign and desirable thermal environment for the surface which is in parallel with the orbit plane.

Depending on the satellite propulsion or attitude control subsystem requirements, the satellite designer may elect to apply only one set of the blocking device on either the north or the south panel, preferably the south panel, of the satellite.

Again, if the spacecraft designer elects to do so, solar cells can be mounted onto the external surfaces of the blocking panel to provide additional power to the satellite.

Referring now to FIG. 1, there is shown an oblique view of a fully deployed satellite spacecraft 1 which is represented by a main body 10 which contains six external panels: 11, 12, 13, 14, 15 and 16, a group of antenna reflectors 20, 21, 22 and 23, and two rows of solar arrays (multiple number of solar panels) 100 and 101 are connected to main body 10 via supports 100a and 101a and are extended northward and southward from the main body out of north and south panels 11 and 12, respectively. The number of antenna reflectors is driven by the need of the communication application and is a matter of design. In this example, four reflectors are shown and are represented by two deployable large reflectors 20 and 21 mounted on east and west panels 15 and 16, respectively. Two non-deployable reflectors 22 and 23 are mounted on nadir panel 14. While orbiting in a low inclination orbit about earth, the satellite will be controlled in such a way that the earth or nadir panel 14 is pointing in the general direction to the center of the earth, thus allowing the antenna reflectors to perform communication functions with earth. Opposite to the earth panel 14 is the zenith panel 13.

The solar arrays 100 and 101 may contain multiple panel elements (typically two to eight or more on each side, a four panel element example is shown in FIG. 1) or may be single cell panels. However, usually multiple solar cell arrays are utilized to provide additional electrical power for the satellite's use. However, the number of panel elements is driven by mission power requirements and the capability of the satellite control systems to maintain the satellite altitude as well as to handle the electrical current generated by the solar arrays. Once the number of the panel elements is defined, it is desired to maximize the electrical power generated by the solar cells which are mounted on one side of the array panels by facing the cell side of the array to the sun ray direction as directly and as long as possible. With satellite main body 10 maintaining its earth panel 14 pointing to the earth continuously, the sun ray will circle about the main body 10 with respect to the north-south axis once every orbit. In order to maintain the solar array pointing directly to the sun, both solar arrays are driven by a motor system which rotates the arrays about the north-south axis with respect to the main body 10 in a speed such that the cell side of the array is always facing the sun while the satellite is orbiting the earth, i.e. the cell side of the solar arrays are rotating about the north-south axis in synchronous rotation to achieve optimum sunlight exposure to maximize power generation.

Figure 2:
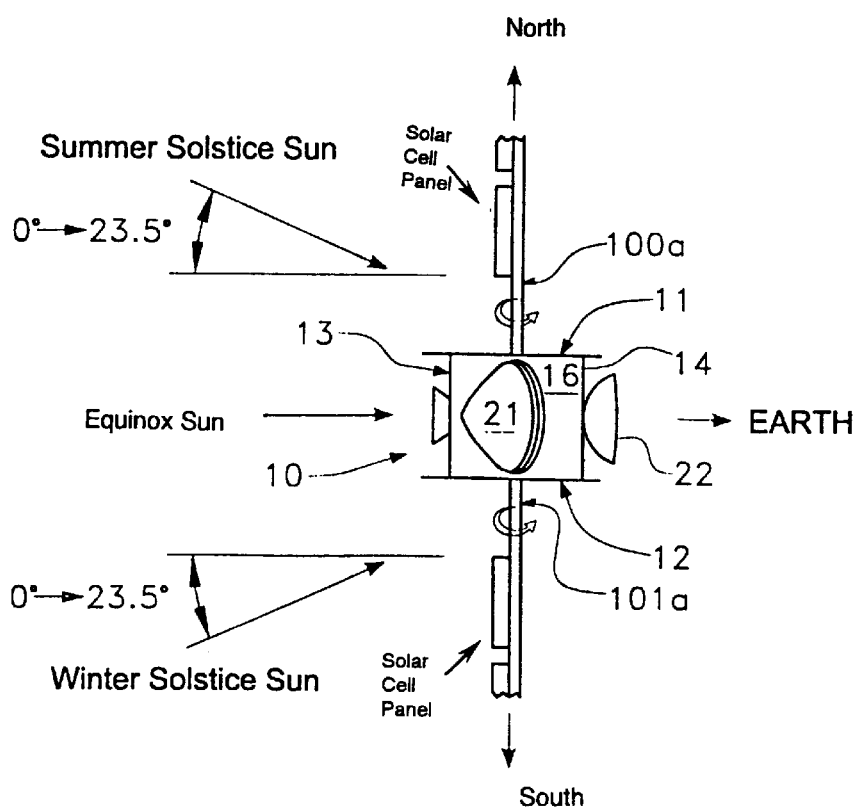
FIG. 2 shows an east panel-based view of the prior art spacecraft illustrated in FIG. 1 orbiting on a low inclination or an equatorial orbit.

Reference is made to FIG. 2, a top view of prior art satellite or spacecraft 10 of FIG. 1, where the aforesaid seasonal exposures are illustrated. (Parts identical to those in FIG. 1 are identically numbered throughout the FIGURES herein and are not all repeated to reduce redundancy. This applies to all of the following FIGURES which illustrate the same spacecraft or the same parts or components.) The north panel 11 and the south panel 12 (FIGS. 1 and 2) are laying in parallel with the satellite orbital plane which is in line with or very close to the equatorial plane of the earth. While the satellite is orbiting the earth, these panels (11 and 12) will not receive daily solar input like other panels: earth panel 14, zenith panel 13, east panel 15 and west panel 16. Those two panels 11 and 12, however, will receive seasonal solar input at a lower incident angle during summer solstice and winter solstice, respectively, as shown.

Figure 3A:
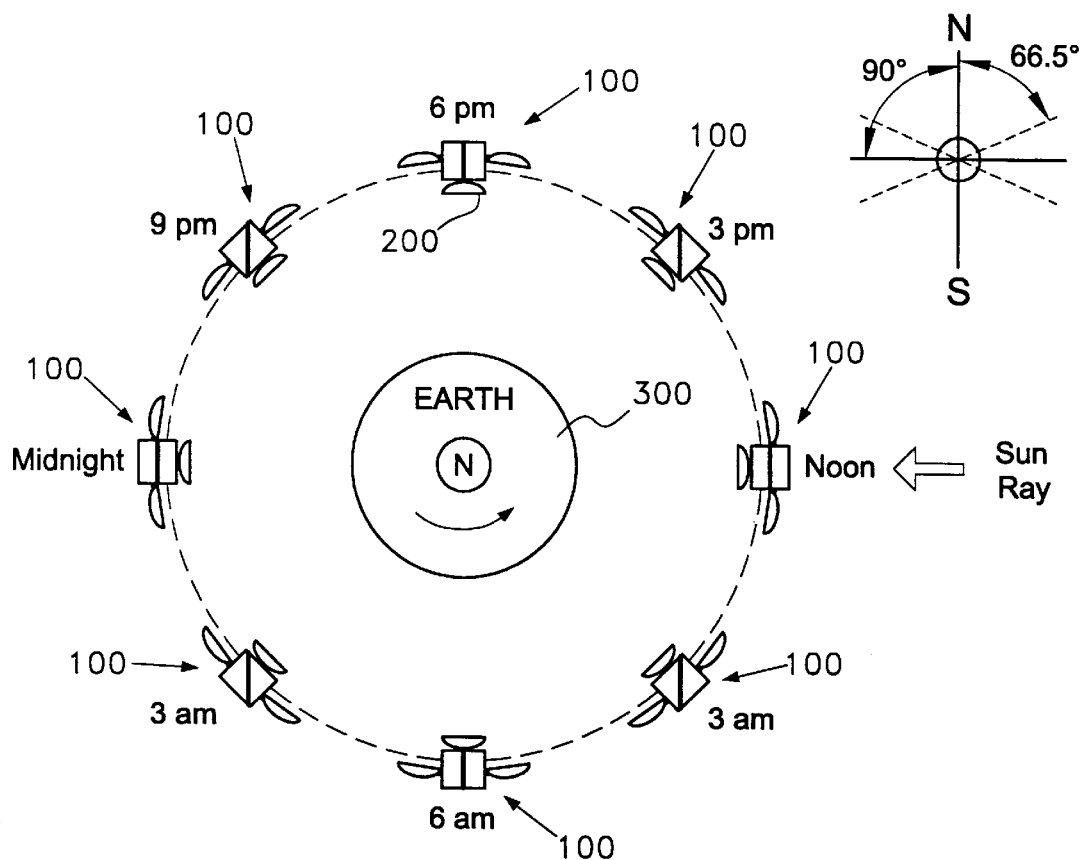
FIG. 3a shows a north panel-based, top view of a spacecraft orbiting about earth at different times of the day.

FIG. 3a shows a north-based top view of a spacecraft 100 orbiting earth at different times of day and illustrates the consistency of the nadir panel 200 facing earth 300 throughout orbit. (Solar panels are shown edge-on out of the paper.)

Figure 3B:
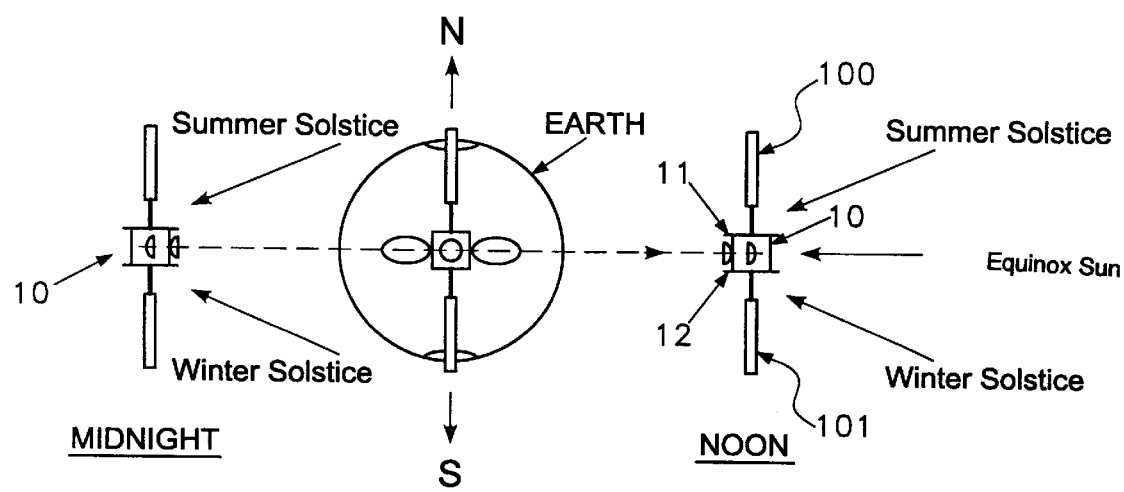
FIG. 3b illustrates a side view of a spacecraft at noon and midnight (opposite) positions and also establishes sun angles for different seasons of the year.

FIG. 3b shows a partial side view of the spacecraft 10 of FIGS. 1 and 2 at midnight, 6 a.m. and noon positions and approximately the sun angles of summer and winter solstice at midnight and noon.

Figure 4A:
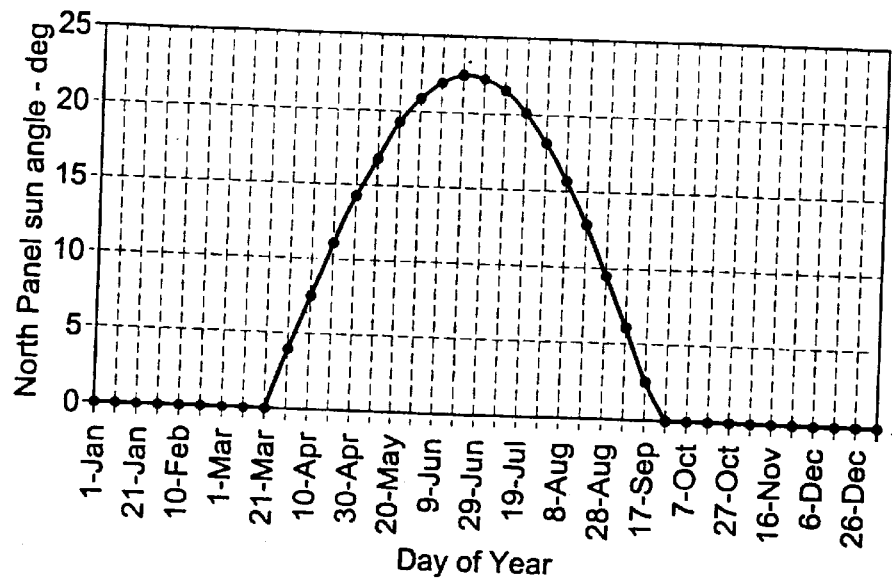
FIGS. 4a and 4b show the solar incident angle variation on north and south panels, respectively, of a spacecraft orbiting earth for one calendar year.
Figure 4B:
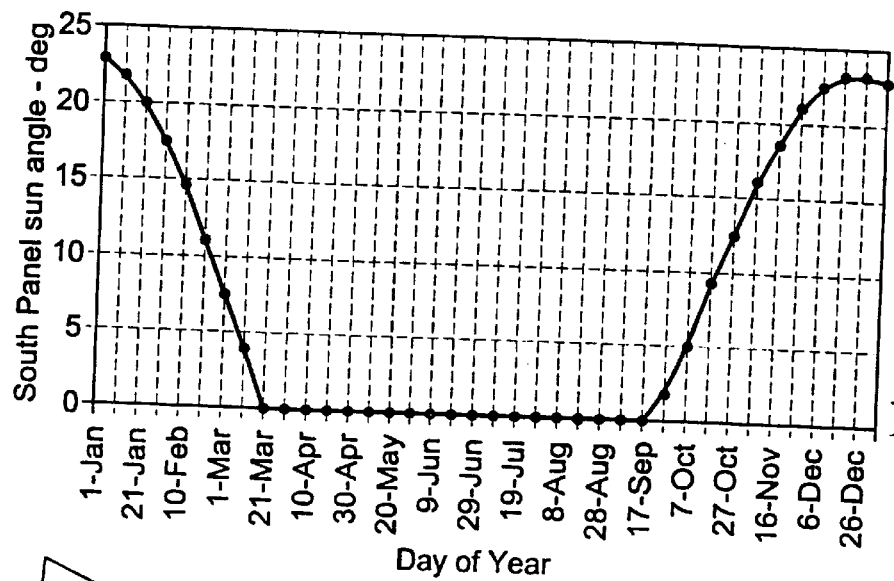

FIGS. 4a and 4b show the profile of the solar incident angle on north and south panels, respectively, such as panels 11 and 12 of spacecraft 10 shown in FIG. 1, for one calendar year.

It can be seen from FIGS. 4a and b that each of the north panel and south panel are receiving incidental sun rays for a portion of the calendar year. Thus, the sun blocking devices will perform their functions for the respected radiator panels for the time period only.

Figure 5:
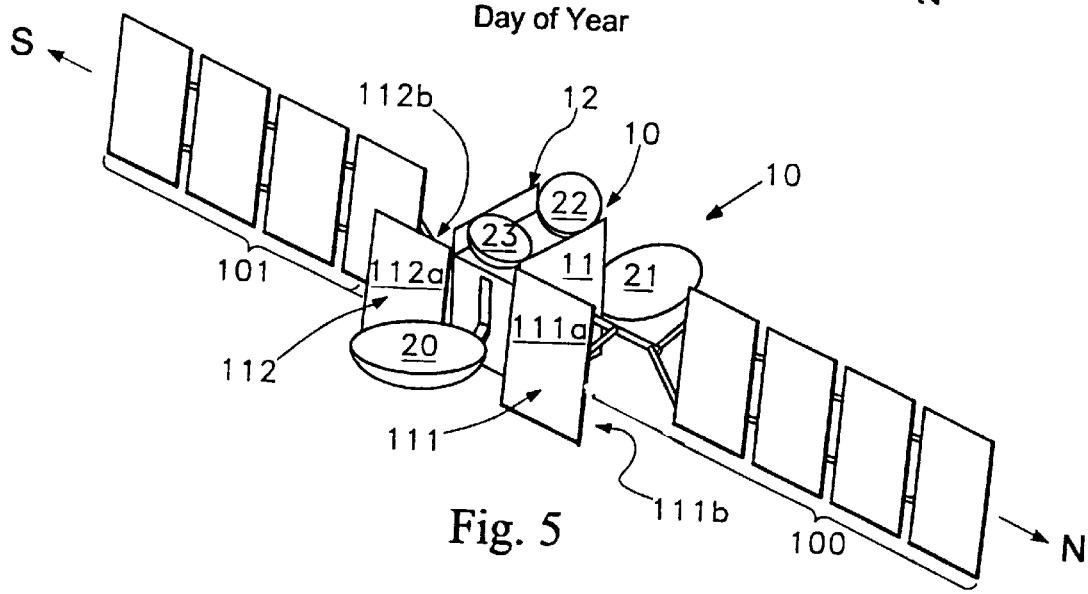
FIG. 5 illustrates a perspective view of a spacecraft configuration according to the present invention.

FIG. 5 illustrates one preferred embodiment of the current invention which eliminates or greatly reduces the seasonal solar input on the north and south panels 11 and 12, thus providing a more efficient thermal radiator for the satellite.

In this present invention embodiment, a sun light blocking device comprises two blocking panels 111 and 112, and a mounting/deployment mechanism through which each blocking panel can be integrated and deployed with the solar array supporting and rotating mechanism. North and south (radiator) panels 11 and 12 will have dedicated blocking devices 111 and 112 to be attached to the north and south solar arrays 100 and 101, respectively, as shown in FIG. 5. After the modified spacecraft 10 has been launched into the orbit and fully deployed, the blocking panels 111 and 112 will have their final position in front of the cell side of the solar array with its surface more or less in parallel with the solar array plane. The blocking panel is positioned in such a way that, during summer solstice when heating from the sun to the south (radiator) panel 12 is maximum, the south blocking device 112 will project its shadow onto the surface of south panel 12 to prevent it from being heated by the solar energy. The north blocking device 111 will correspondingly perform relative to the north panel 11 during winter solstice. When the solar arrays 100 and 101 are rotating in synchronization with the sun's rays as the satellite orbits the earth, the sun ray blocking device will rotate with the solar arrays and continuously shade the respective radiator panel.

The material used for the sun blocking panels 111 and 112 shall minimize the heat transferred from their sun facing surfaces 111a and 112a to their back-to-sun surfaces 111b and 112b. The insulation material may be known insulative materials such as composite materials utilizing Mylar and fabric to make a multi-layer insulation (MLI). These materials are well known in the space industry. The sun blocking panels of the present invention generally create a sizable temperature difference (e.g. may be more than 100° C.) between surface 111a and surface 111b when the satellite is operating in normal attitude in the orbit (except when the satellite is in the eclipse of earth).

To obtain the maximum sun blocking effect, the surface area of the sun ray blocking panels 111 and 112 shall be sized in such a way that, during summer and winter solstice while the sun is about 23.5° from the orbit plane, the panel shall create a projected shadow area larger or equal to the diagonal length of their perspective radiator panels 11 and 12.

Figures 6A, 6B, 6C:
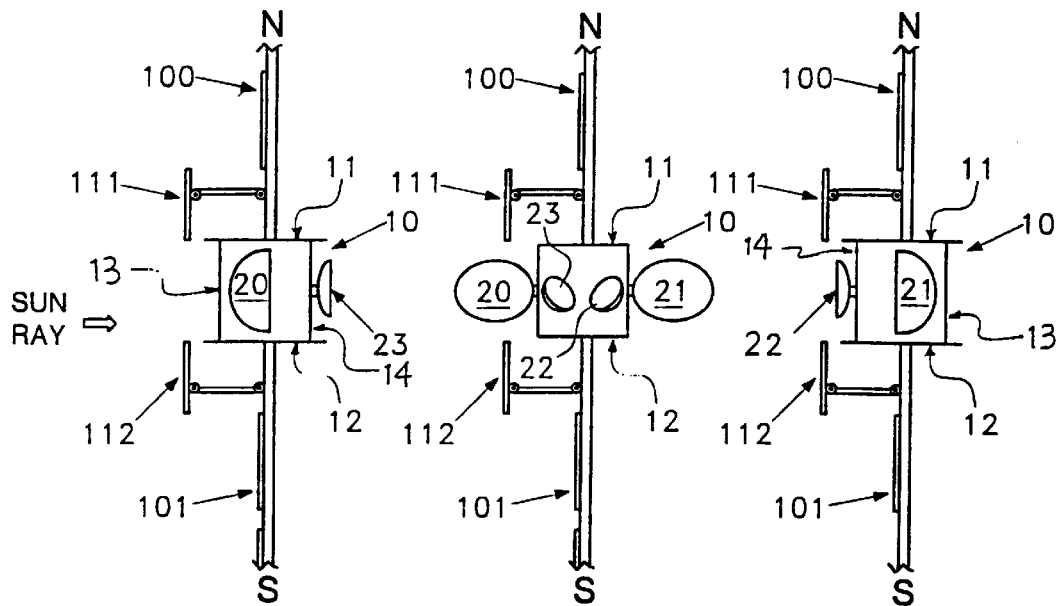
FIGS. 6a, 6b and 6c illustrate top views of a present invention arrangement as the main body of the spacecraft orbits and always faces earth and the solar arrays and sunlight blocking devices together always face the sun.

FIGS. 6a, 6b and 6c show top partial views of a present invention arrangement as a main body 10 of the spacecraft orbits earth and earth panel always faces earth. Thus, FIGS. 6a, 6b and 6c show the relative changes of main body 10 using a frame of reference of solar panels 100 and 101 with blocking panels 111 and 112 always facing the sun (facing left in the FIGURES). Thus, if you were standing on solar panel 101 you would see main body 10 rotate one complete cycle with each earth orbit.

Figures 7, 8, 9:
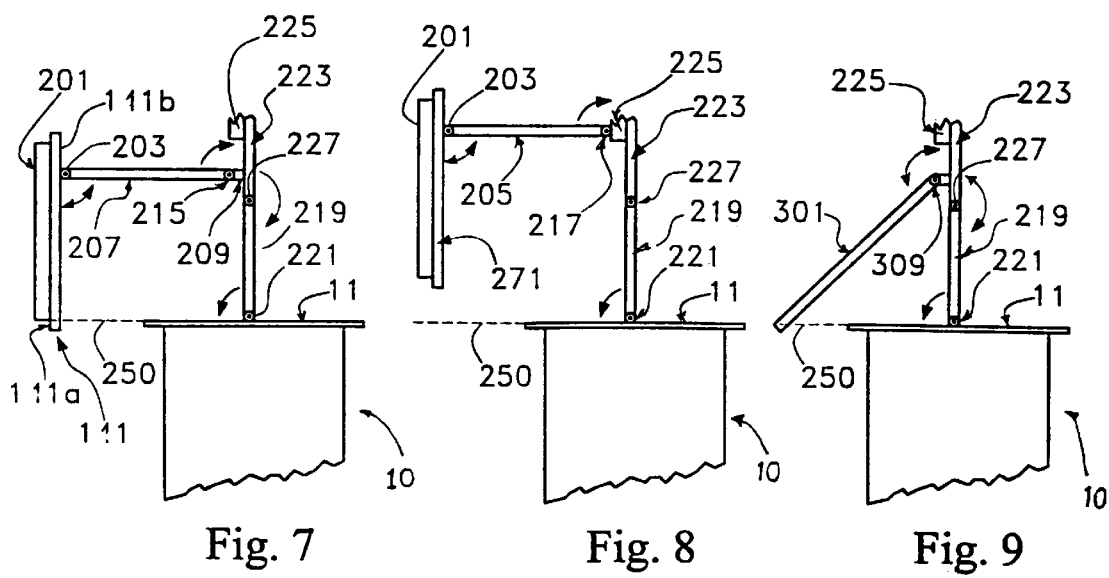
FIGS. 7, 8 and 9 illustrate top views of present invention devices utilizing different attachment arrangements.

FIG. 7 shows a top partial cut view of more details of a present invention spacecraft and FIGS. 8 and 9 also show alternative embodiment arrangements in top partial cut views as well.

In FIG. 7, spacecraft 10 has north panel 11 with a solar cell array 223. In this case, there is a connecting portion 219 and hinge points 221 and 227. This array 223 and its connecting portion 219 and hinge points 221 and 227 constitute a solar cell panel assembly. A portion of a solar cell 225 on solar cell array 223 is also shown. Connecting portion 219 folds forwardly against north panel 11 and the upper portion folds down at hinge point 227 in an accordion-like fashion for launching. During deployment, the solar cell array 223 is in its folded, closed position and is electromechanically or mechanically opened in space to deploy the solar cells. Attached to solar cell array 223 is a two-section connecting arm having a short inner portion 209 and an elongated portion 207 connected by hinge point 215. Solar blocking device 141 is connected to arm elongated portion 207 by hinge point 203 to back 141b of solar blocking device 141. Optional solar cell 201 is functionally positioned on front surface 141a of solar blocking device 141. Hinge points 203 and 215 provide for folding of solar blocking device 141 against solar cell 225 for compact launching and subsequent deployment. The electromechanical aspects of opening and closing solar arrays is commonly used with the current spacecraft and is the same mechanism used to deploy solar blocking device 141. These deployment mechanics are well within the skill of the artisan.

In FIG. 7, there is an imaginary plane 250 extending off the surface of north panel 11. Solar blocking device 141 may intersect or exceed this imaginary surface in its deployed position, thus providing additional shading for earth, west, zenith and east panels as they rotate with respect to the sun.

FIG. 8 shows an alternative embodiment where sun blocking device 271 does not intersect imaginary plane 250. Further, it has a single connecting arm 205 with hinge points 203 and 217 at opposite ends to form an assembly and is connected directly to solar cell 225. It may be folded and unfolded for launching and deployment just as solar blocking device 141 of FIG. 7 functions. In FIGS. 7 and 8, the sun blocking devices cast a shadow on at least a majority of the outer surface of north panel 11 and, in these embodiments, completely shadow that surface during solar exposure. Further, the solar cell 201 provides additional, beneficial power to the spacecraft.

In FIG. 9, identical parts to FIGS. 7 and 8 are identically numbered. Sun blocking device 301 is connected directly to solar cell array 223 with hingepoint 309 so as to fold over against solar cell 225 during launching. In this embodiment, sun blocking device 301 is not in parallel with the solar array, yet still effectively shades north panel 11.

FIGS. 10a, 10b and 10c depict a typical prior art solar cell array deployment configuration in a representative sequence to transform a spacecraft from launch configuration to normal orbital operation configuration. For the purpose of simplification, only half (north side) of the solar cell arrays are shown. These particular FIGURES show a satellite 400 having four solar cell panels 400a attached to arrays 408 connected through four hinge points 402, 403, 404 and 405 and then connected to the spacecraft via a single boom 419 and hinge point 401. FIG. 10a shows the device closed, FIG. 10b shows it in the process of being opened, and FIG. 10c shows full deployment. If multiple boom design is desired, the improved embodiment can be tailored to fit the design with additional arm(s) and hinge point(s).

FIGS. 11a, 11b and 11c illustrate the deployment sequence of one possible design for the present improved invention. In addition to the prior art solar cell panel array assembly shown in FIGS. 10a, 10b and 10c (where identical parts in those FIGURES are identically numbered in these FIGURES), present invention blocking panel 411 shown in FIGS. 11a, 11b and 11c is connected to solar cell array assembly boom 419, or other appropriate location by design, via an elongated connecting mechanism 430 with two hinge points 406 and 407. FIG. 11a shows the device closed, FIG. 11b shows it partially deployed and FIG. 11c illustrates full deployment.

FIGS. 12a and 12b show a sun blocking panel which is not in parallel with the plane containing the solar cell arrays, yet still provides proper shading to the north or south panel. The common components from previous FIGURES are identically numbered.

FIG. 13 shows a simplified version of the present invention (again as in FIGS. 10a, b, c and others, as well as FIGS. 14a and b, and 15a and b base structures 400 and 408 shown in FIG. 10a are utilized for illustration purposes and identical parts here and below are identically numbered and need not be repeated). The blocking panel 511 is directly connected to the solar cell array mechanism 219 with hinge point 507 for easy deployment.

FIGS. 14a and b show an arrangement similar to that in FIG. 13, with identical parts identically numbered, however, more hinge points 606 and 607 were used with blocking panel 611 as required by design for folding the panels prior to deployment. FIG. 14b represents the side view of the front view shown in FIG. 14a.

FIGS. 15a and 15b show one embodiment in which blocking panel 811 utilizes separate active motors 306 and 307 which are used to actively deploy and/or retract the blocking device. This arrangement allows satellite operators to use separate deployment motors from the solar panel deployment motors so as to permit them to retract the blocking panels to prevent their interference in satellite operations such as in the use of propulsion systems during satellite performance of station keeping or altitude control maneuvers.

The required dimensions and/or size (area) of the blocking panel may exceed the envelope of the north or south panels when the solar cell panels and blocking device are folded in launch configuration. Therefore, the blocking panel may need additional deployment after solar cell array deployment in order to achieve the desired dimensions. FIGS. 16a, 16b and 16c, and FIGS. 17a, 17b and 17c, respectively show samples of deployment arrangements in front, closed top and open top views. This allows the blocking device to increase its dimensions using hinge points or a slide-out design. Referring collectively to all FIGS. 16, blocking panel 921 has a center section 923 with auto hinges 925 and 927 and outer, swing up panels 929 and 931. On all FIGS. 17, blocking panel 951 has main section 953 with automatic slide-out sections 955 and 957. (Automatic hinging and automatic sliding or telescoping is well within the purview of the artisan in the spacecraft industry and need not be elaborated upon.) These descriptions are samples from thousands of possible deployment designs which can be used for this purpose and within the scope of the present invention.

This paragraph describes calculational approaches to provide total shadow coverage to a quasi-rectangular shaped north or south panel during summer or winter solstice, when the incident angle of the sun's rays is at a maximum, by using a quasi-rectangularly shaped blocking panel which is in parallel with the solar cell array (refer to FIG. 12a, angle 501 is 90°). Assume either the north panel or south panel has length-by-width dimensions of A-by-B, with A greater or equal to B. The fully deployed sun blocking panel shall have dimensions no smaller than L-by-W (refer to FIG. 16), where Length=$\sqrt{(A^2+B^2)}$ and Width=0.4×A, i.e. 40% of A, based on the approximate value of sin(23.5°). However, if only a portion of the surface area on the north or south panel needs to be shadowed, i.e. high power components were mounted locally in a certain area, the sun ray blocking device can be tailored to cover only those areas and may be smaller. In addition, if a sun blocking panel not in parallel with the plane of the solar cell array was selected by the spacecraft designer, the value of parameter W may be greater or less than 0.4×A depending on the size of angle 501 in FIG. 12a. If angle 501 is greater than 90°, W may be greater than 0.4×A; if it is less than 90°, W may be less than 0.4×A. If additional shading to the other four panels, earth, zenith, east and west panels, are desired, the width (W) of the blocking panel can be increased to extend past the imaginary plane 250 toward the center of the satellite as shown in FIG. 7.

Thus, it can be seen by the present invention that losses resulting from undesirable solar heating can be eliminated or minimized via various sun blocking arrangements to the heat rejecting panels.

Obviously, numerous modifications and variations of the present invention are possible in light of the above teachings. For example, as a practical matter, a designer might counterweight or counterbalance the rotating axles or arms to overcome the weight imbalance caused by blocking devices of the present invention without exceeding the scope of the present invention. It is therefore understood that within the scope of the appended claims, the invention may be practiced otherwise than as specifically described herein.

What is claimed is:

1. In a three axis stabilized spacecraft for orbiting about a planet and having at least one solar cell assembly having at least one solar cell panel, and being a north solar cell panel assembly or a south solar cell panel assembly, said at least one solar cell panel assembly being mounted on an axle so as to be controllably rotated from said spacecraft about an axis of rotation so as to face the sun, said spacecraft having a nadir panel which is generally pointing to the center of the planet, an opposite panel known as a zenith panel, which faces away from the center of the planet and sharing the same planar normal vector as said nadir panel, an east panel and a west panel, said east panel and said west panel having their planar normal vector laying on an orbital plan pointing to the velocity vector of the spacecraft generally tangential to the direction of travel on the orbit, and a north panel and a south panel, said north panel and said south panel having their planar normal vector generally perpendicular to the orbit plan and parallel to the axis of rotation of the planet, said solar cell panel extending outwardly from said spacecraft, the improvement which comprises:

Attaching at least one sun ray blocking device to said at least one solar cell panel, said at least one device being either a north blocking device or being a south blocking device and corresponding to said at least one solar cell panel, each of said at least one sun ray blocking device being positioned forwardly from and offset relative to a solar cell surface of a solar cell panel and at a predetermined angle to either of said north panel and said south panel, said north panel or said south panel, said sun ray blocking device being positioned so as to cast a shadow on at least a majority of the exposed surface of its corresponding north or south panel during solar exposure thereto.

2. The spacecraft of claim 1 wherein said blocking device has at least a portion thereof intersecting an imaginary planar surface extending from and in the same plan as said solar cell panel.

3. The spacecraft of claim 1 wherein said blocking device includes an attachment arm connected to said solar cell panel assembly.

4. The spacecraft of claim 3 wherein said arm is hingedly connected and has a first, closed position which positions said blocking device adjacent to said spacecraft for transport in a non-functioning position, and a second, opened position which positions said blocking device in a deployed, functioning position.

5. The spacecraft of claim 4 wherein said sun blocking device hinge connection includes active motors to deploy the blocking device.

6. The spacecraft of claim 1 wherein said blocking device comprises a material having heat insulation characteristics.

7. The spacecraft of claim 1 wherein said blocking device contains solar cells which are electrically connected to said spacecraft to provide additional power thereto.

8. The spacecraft of claim 1 wherein said, blocking device contains an extension mechanism to increase its size after deployment to create adequate shadow coverage to said north panel or said south panel.

9. The spacecraft of claim 1 wherein said blocking devices comprises a heat insulation panel having external surfaces having a solar absorptivity substantially lower then its thermal emissivity, including an optical solar reflector.

10. The spacecraft of claim 1 wherein said orbit is a sun-synchronized fixed orbit sun angle orbit.

11. In a three axis stabilized low inclination orbit spacecraft for orbiting about the earth and having two sets of solar cell array assemblies having solar cell arrays, one set being a north solar array assembly and the other being a south solar array assembly, said assemblies each being mounted on an axle so as to be controllably rotated from said spacecraft about an axis of rotation so as to face the sun, said spacecraft having an earth panel which is generally pointing to the center of the earth, an opposite panel known as a zenith panel, which faces away from the center of the earth and sharing the same planar normal vector as said earth panel, an east panel and a west panel, said east panel and said west panel having their planar normal vector laying on an orbital plan pointing to the velocity vector of the spacecraft generally tangential to the direction of travel on the orbit, and a north panel and a south panel, said north panel and said south panel having their planar normal vector generally perpendicular to the orbit plan and parallel to the axis of rotation of the earth, said solar cell panel extending outwardly from said spacecraft, the improvement which comprises:

Attaching at least one sun ray blocking device to each of said north solar array and said south solar array, one device being a north device and another device being a south device, each of said sun ray blocking devices being in the form of a panel and being positioned forwardly and offset relative to the solar cell surface of a solar array and at a predetermined angle to said north panel and said south panel, said north blocking device being positioned so as to cast a shadow on at least a majority of the exposed surface of said north of panel during solar exposure thereto, and said south blocking device being positioned so as to cast a shadow on the exposed surface of said south panel during solar exposure thereto.

12. The spacecraft of claim 11 wherein said north blocking device has at least a portion thereof intersecting an imaginary planar surface extending from and in the same plan as said north panel, and said south blocking device having at least a portion thereof intersecting an imaginary planar surface extending from and in the same plan as said south panel.

13. The spacecraft of claim 11 wherein said north blocking device includes an attachment arm connected to said north solar cell array assembly and said south blocking device includes an attachment arm connected to said south solar cell array assembly.

14. The spacecraft of claim 13 wherein each of said arms is hingedly connected and has a first, closed position which positions said blocking device adjacent to said spacecraft for transport in a non-functioning position, and a second, opened position which positions said blocking device in a deployed, functioning position.

15. The spacecraft of claim 11 wherein each of said sun blocking device hinge connections includes active motors to deploy the blocking device.

16. The spacecraft of claim 11 wherein said north blocking device and said south blocking device comprise a material having heat insulation characteristics.

17. The spacecraft of claim 11 wherein said north blocking device and said south blocking device each contain solar cells which are electrically connected to said spacecraft to provide additional power thereto.

18. The spacecraft of claim 12 wherein said north blocking device and said south blocking device each contain an extension mechanism to increase its size after deployment to create adequate shadow coverage to said north panel or said south panel.

19. The spacecraft of claim 11 wherein each of said blocking devices comprise a heat insulation panel having external surfaces having a solar absorptivity substantially lower then its thermal emissivity, including an optical solar reflector.

20. The spacecraft of claim 11 wherein said orbit is a sun-synchronized fixed orbit sun angle orbit.

* * * * *